United States Patent

Takahara et al.

[11] Patent Number: 5,773,942
[45] Date of Patent: Jun. 30, 1998

[54] POWER WINDOW MOTOR DRIVING APPARATUS

[75] Inventors: Yoshiyuki Takahara; Tomohiro Iida, both of Shizuoka, Japan

[73] Assignee: Yazaki Corporation, Minato-ku, Japan

[21] Appl. No.: 651,762

[22] Filed: May 22, 1996

[30] Foreign Application Priority Data

May 24, 1995 [JP] Japan .................................. 7-124861
Jul. 6, 1995 [JP] Japan .................................. 7-171046

[51] Int. Cl.$^6$ ..................................................... H02P 1/00
[52] U.S. Cl. ........................ 318/280; 318/483; 318/466; 364/424.5
[58] Field of Search ................................. 318/483, 466, 318/280; 15/250.17; 307/9.1, 10.1; 364/424.05

[56] References Cited

U.S. PATENT DOCUMENTS 5,081,586 1/1992 Barthel et al. ..................... 307/10.1 X
5,559,375 9/1996 Jo et al. ............................. 307/10.1

*Primary Examiner*—Karen Masih
*Attorney, Agent, or Firm*—Armstrong, Westerman, Hattori, McLeland & Naughton

[57] ABSTRACT

A power window motor drive apparatus, which, in the event of data error of the external command data, from the driver's seat limits the generation of drive signals for the power window motor that are based on the internal command data internally generated by the operation of the window switch and on the external command data received from outside through the communications line. An external command data reference inhibit means is provided to inhibit only the generation of the drive signals based on the external command data.

4 Claims, 11 Drawing Sheets

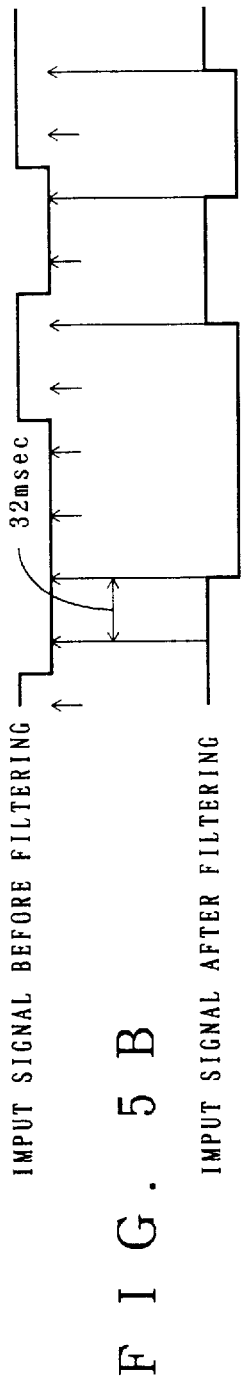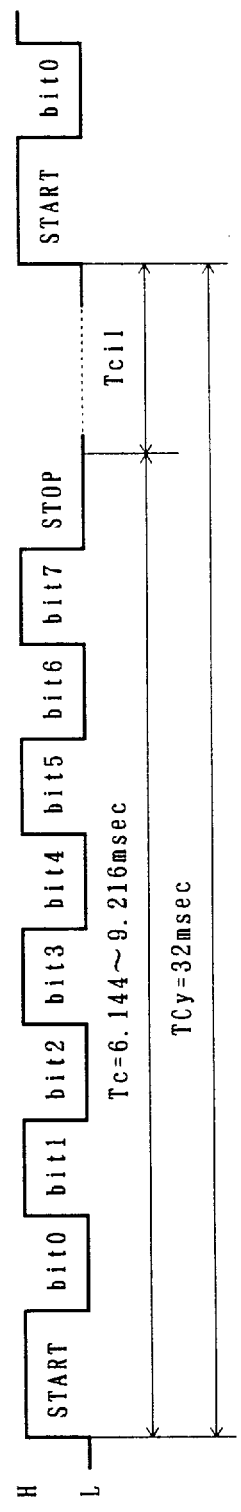

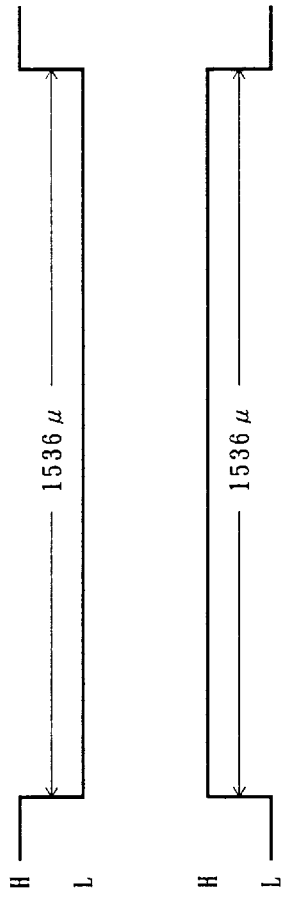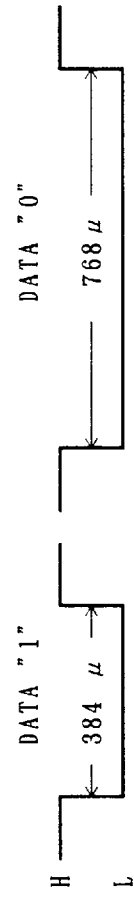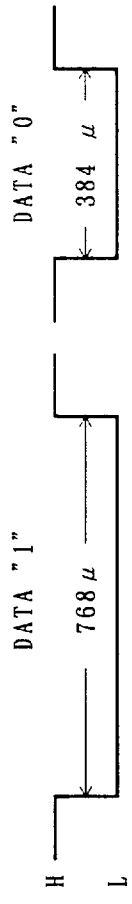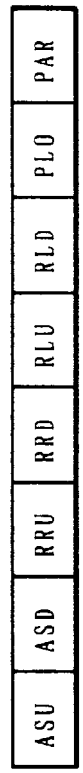

FIG. 11

```
                                        ┌─307b
┌────────────────────────────┐  ┐
│     DECISION TABLE AREA    │  │
├────────────────────────────┤  │
│                            │  ├ DATA AREA
│                            │  │
├────────────────────────────┤  ┘
│      IDLE FLAG AREA        │  ┐
├────────────────────────────┤  │
│      IDLE TIMER AREA       │  │
├────────────────────────────┤  ├ WORK AREA
│     ERROR COUNTER AREA     │  │
├────────────────────────────┤  │
│ PREVIOUS RECEPTION DATA BUFFER AREA │ │
└────────────────────────────┘  ┘
```

FIG. 12

|  | FRONT PASSENGER SEAT UNIT 3 | REAR RIGHT SEAT UNIT 5 | REAR LEFT SEAT UNIT 7 |
|---|---|---|---|
| AD 0 | L | H | H |
| AD 1 | L | L | H |

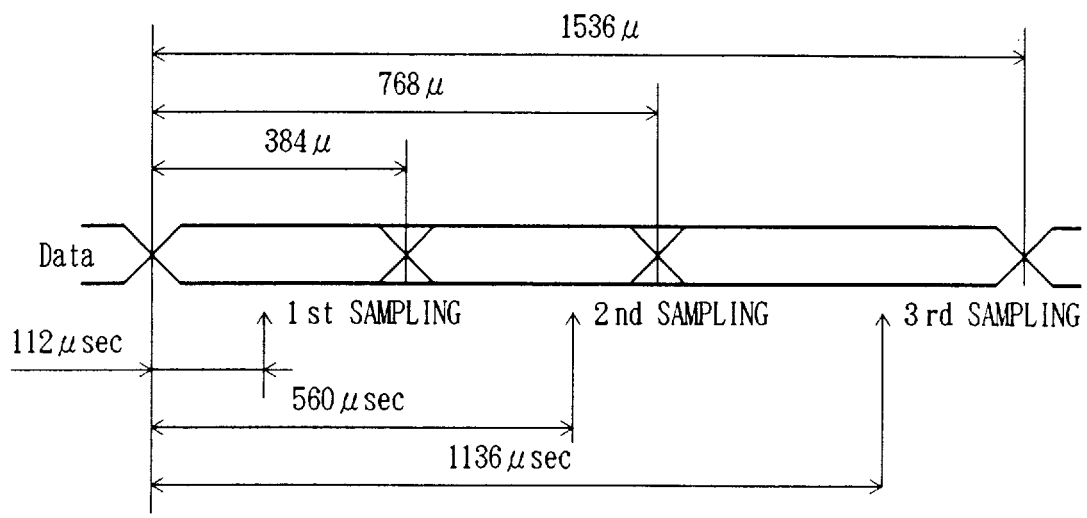

POWER WINDOW MOTOR DRIVING APPARATUS

BACKGROUND OF THE INVENTION

1. Field of the Invention

The present invention relates to a power window motor driving apparatus for driving power window motors for opening and closing windows at each seat in a vehicle and more specifically to a power window motor driving apparatus that allows the power window motor of a seat to be driven not only by a local switch dedicated to the seat but also by remote switches of other seats.

2. Description of the Related Art

A power window system that has come into widespread use in vehicles such as passenger cars generally opens or closes windows by operating an open-close switch arranged on the door trim or arm rest to forwardly or reversely drive a power window motor installed on the inside of a door trim.

In many vehicles, each of the seats is provided with the open-close switch for its own window and the driver's seat is provided also with a switch for operating the windows of other seats as well as the switch for its own window, so that a driver at his or her seat can open or close the windows of front or rear passenger seats.

FIG. 2 illustrates circuitry, shown partly in blocks, illustrating the outline configuration of a conventional multiplex communication system for automotive power window switches having a power window motor driving apparatus. This multiplex communication system has a driver's seat unit 1 with a transmission function, and a front passenger seat—or assistant driver's seat—unit 3, a rear right seat unit 5A and a rear left seat unit 5, all three passenger seat units having a reception function.

These units 1–7 are interconnected via a multiplex bus line 9 and supplied electricity from a battery 11 for operation.

The driver's seat unit 1, as shown in FIG. 3, includes a motor 101 for opening and closing the driver's seat window, a driver 103 having two relays (not shown) for switching the terminals 101a, 101b of the motor 101 between the battery 11 side and the ground side, a switch 105 for driver's seat window, a switch 107 for the front passenger seat, a switch 109 for the rear right seat window, and a switch 111 for the rear left seat window.

The driver's seat unit 1A also has a window lock switch 113 that nullifies the local switch operations at the front passenger seat, rear right seat and rear left seat 3–7 to operate their own windows, and a microcomputer 115 that controls the operation of the motor 101 and the signal transmission via the multiplex bus line 9 to the units 3–7 of the front passenger seat, rear right seat and rear left seat.

The microcomputer 115 drives the motor 101 through the driver 103 according to the operation of the driver's seat window switch 105 and sends frame data, which contains a plurality of digital data representing the operations of the switches 107–111 for the windows at the front passenger seat, rear right seat and rear left seat, to the units 3–7 of the front passenger seat, rear right seat and rear left seat via the multiplex bus line 9, simultaneously.

The front passenger seat unit 3, rear right seat unit 5 and rear left seat unit 7, all of which receives the frame data from the driver's seat unit 1 through the multiplex bus line 9, have basically the same configurations.

As representatively shown by the front passenger seat unit 3 in FIG. 19, these units 3–7 each include a motor 301 for opening and closing their own window, a driver 303 having two relays (not shown) for switching the terminals 301a, 301b of the motor 301 between the battery 11 side and the ground side, a local switch 305 for their own window, and a microcomputer 306 that controls the operation of the motor 301 and the reception of the transmitted data from the driver's seat unit 1 through the multiplex bus line 9.

The microcomputer 306 receives the frame data representing the operations of the window switches 107–111 sent from the driver's seat unit 1 through the multiplex bus line 9 and extracts a part of the transmitted data that is related to the unit's own window. According to the extracted data and the operation of the window open-close switch 305, the microcomputer 306 outputs a motor drive signal to the motor 301 through the driver 303.

In the multiplex communication system for automotive power window switches with the above configuration, the multiplex bus line 9 is normally formed of a single line rather than a dual line for the purpose of reducing the system cost.

Hence, with the conventional system, when data errors such as frame data reception failures or invalidation of data occur due to failed multiplex bus line 9, communication anomaly or noise, the lack of a backup line degrades the reliability of the data part of the frame data that is related to the destination units, causing the microcomputers 306 in the units 3A–7A of the front passenger seat, rear right seat and rear left seat to stop outputting the motor drive signals.

In the conventional system, therefore, even when there is no trouble with the units 3A–7A of the front passenger seat, rear right seat and rear left seat, a problem with the multiplex bus line 9 or driver's seat unit 1A renders impossible not only the remote operations of the passenger seat windows performed by the window switches 107–111 of the driver's seat unit 1A but also the local operations of these windows performed by the local passenger seat window switches 305 of the units 3A–7A at the front passenger seat, rear right seat and rear left seat.

SUMMARY OF THE INVENTION

The present invention has been accomplished to deal with the foregoing situation and its objective is to provide a power window motor driving apparatus, which allows the power window motor to be driven not only by the associated local widow switch but also by the externally received data generated by the operation of other seat units, and which, when external data cannot be received correctly due to reception failure and invalidation of data, prevents the window operation from being rendered impossible at all.

To achieve the above objective, the present invention, as shown in FIG. 1, offers a power window motor driving apparatus 3 (5, 7), which generates a drive signal PUO, PDO for a power window motor 301 based on internal command data PDU, PDD internally generated by the operation of a window switch 305 and on external command data ASU, ASD (RRU, RRD, RLU, RLD) received from outside through a communications line 9; which, in the event that a data error occurs in the external command data ASU, ASD (RRU, RRD, RLU, RLD), limits the generation of the drive signal PUO, PDO; and which comprises an external command data reference inhibit means 307A which, in the event that a data error occurs in the external command data ASU, ASD (RRU, RRD, RLU, RLD), inhibits only the generation of the drive signal PUO, PDO based on the external command data ASU, ASD (RRU, RRD, RLU, RLD).

This invention also provides a power window motor driving apparatus, which comprises: a normal data holding means 307*b* for holding the external command data ASU, ASD (RRU, RRD, RLU, RLD) during normal state; and a normal data updating means 307B for updating the data held in the normal data holding means 307*b* to latest reception data every reception cycle of the external command data ASU, ASD (RRU, RRD, RLU, RLD) while the external command data ASU, ASD (RRU, RRD, RLU, RLD) is being received normally; wherein in the event that a data error occurs in the external command data ASU, ASD (RRU, RRD, RLU, RLD), the drive signal PUO, PDO is generated based on the external command data ASU, ASD (RRU, RRD, RLU, RLD) held in the normal data holding means 307*b* and the internal command data PDU, PDD.

Further, this invention provides a power window motor driving apparatus, which comprises: an error time measuring means 307C to measure a time that elapses from the occurrence of a data error in the external command data ASU, ASD (RRU, RRD, RLU, RLD); and a normal external command data reference inhibit means 307D which, when the time measured by the error time measuring means exceeds a predetermined time, inhibits the generation of the drive signal PUO, PDO based on the external command data ASU, ASD (RRU, RRD, RLU, RLD) held in the normal data holding means 307*b*.

Further, this invention provides a power window motor driving apparatus, in which the error time measuring means 307C have an error cycle count means 307E to count the number of reception cycles during the data error in the external command data ASU, ASD (RRU, RRD, RLU, RLD), and the normal external command data reference inhibit means 307D inhibits the generation of the drive signal PUO, PDO based on the external command data ASU, ASD (RRU, RRD, RLU, RLD) held in the normal data holding means 307*b* when the number of cycles counted by the error cycle count means 307E exceeds a predetermined number.

With this invention, because, when a data error occurs in the external command data ASU, ASD (RRU, RRD, RLU, RLD) received from outside through the communications line 9, the external command data reference inhibit means 307A inhibits the generation of the drive signal PUO, PDO for the power window motor 301 based on the external command data ASU, ASD (RRU, RRD, RLU, RLD), the drive signal PUO, DO is generated based only on the internal command data PDU, PDD internally produced by the operation of the window switch 305 while the data error exists.

Therefore, in the event of data errors such as failure to receive external command data ASU, ASD (RRU, RRD, RLU, RLD) and invalidation of data due to communications line 9 failure, communication anomaly or noise, even when the communications line is a single line rather than a dual line and no backup line is provided, it is still possible to open or close the window by the operation of the window switch 305.

In the event of data error in the external command data ASU, ASD (RRU, RRD, RLU, RLD), the normal external command data ASU, ASD (RRU, RRD, RLU, RLD) held in the normal data holding means 307*b* is referenced along with the internal command data PDU, PDD in generating the drive signal PUO, PDO. It is also possible to provide a normal data updating means 307B, which updates the data held in the normal data holding means 307*b* to the latest reception data every reception cycle of the external command data ASU, ASD (RRU, RRD, RLU, RLD) while the external command data ASU, ASD (RRU, RRD, RLU, RLD) is being received correctly.

This configuration makes it possible, when a data error occurs, to generate the same drive signal PUO, PDO that was being generated based on the external command data ASU, ASD (RRU, RRD, RLU, RLD) immediately before the data error. This in turn allows the same window operation that was being performed immediately before the data error to be executed without normal external command data ASU, ASD (RRU, RRD, RLU, RLD).

The generation of the drive signal PUO, PDO in the event of data error by referencing the data held in the normal data holding means 307*b* may be inhibited by the normal external command data reference inhibit means 307D when the time measured from the occurrence of the data error by the error time measuring means 307C exceeds a predetermined time. Thereafter, only the generation of the drive signal PUO, PDO may be permitted that is based on the internal command data PDU, PDD internally produced by the operation of the window switch 305. In that case, the measurement of time from the occurrence of the data error by the error time measuring means 307C may be based on the number of reception cycles in the data error period of the external command data ASU, ASD (RRU, RRD, RLU, RLD) that is counted by the error cycle count means 307E.

BRIEF DESCRIPTION OF THE DRAWINGS

FIG. 5 is a waveform diagram showing the correspondence between a waveform of an input signal before being filtered by the CPU of FIG. 4 and a waveform after being filtered, with FIG. 5A representing a waveform before filtering and FIG. 5B representing a waveform after filtering;

FIG. 6 is a waveform diagram showing the character configuration of a frame used for data transmission through the multiplex line of FIG. 2;

FIG. 7 is a waveform diagram showing the bit format of each character of FIG. 6, with FIG. 7A representing a start bit, FIG. 7B a stop bit, and FIG. 7C and 7D data bits;

FIG. 8 is a format structure of a data portion of the frame of FIG. 6;

FIG. 11 is a RAM memory area map of the microcomputer of FIG. 10;

FIG. 12 is a self-address allocation table set in the microcomputer of FIG. 10 by a self-address setting switch;

FIG. 15 is a timing chart showing data sampling timings when the CPU of the microcomputer of FIG. 10 detects bits of the received data;

FIG. 16 is a decision table used in detecting bits of the received data at the sampling timing of FIG. 15;

DETAILED DESCRIPTION OF PREFERRED EMBODIMENT

The power window motor driving apparatus of this invention is described by referring to the accompanying drawings.

Figure 1:
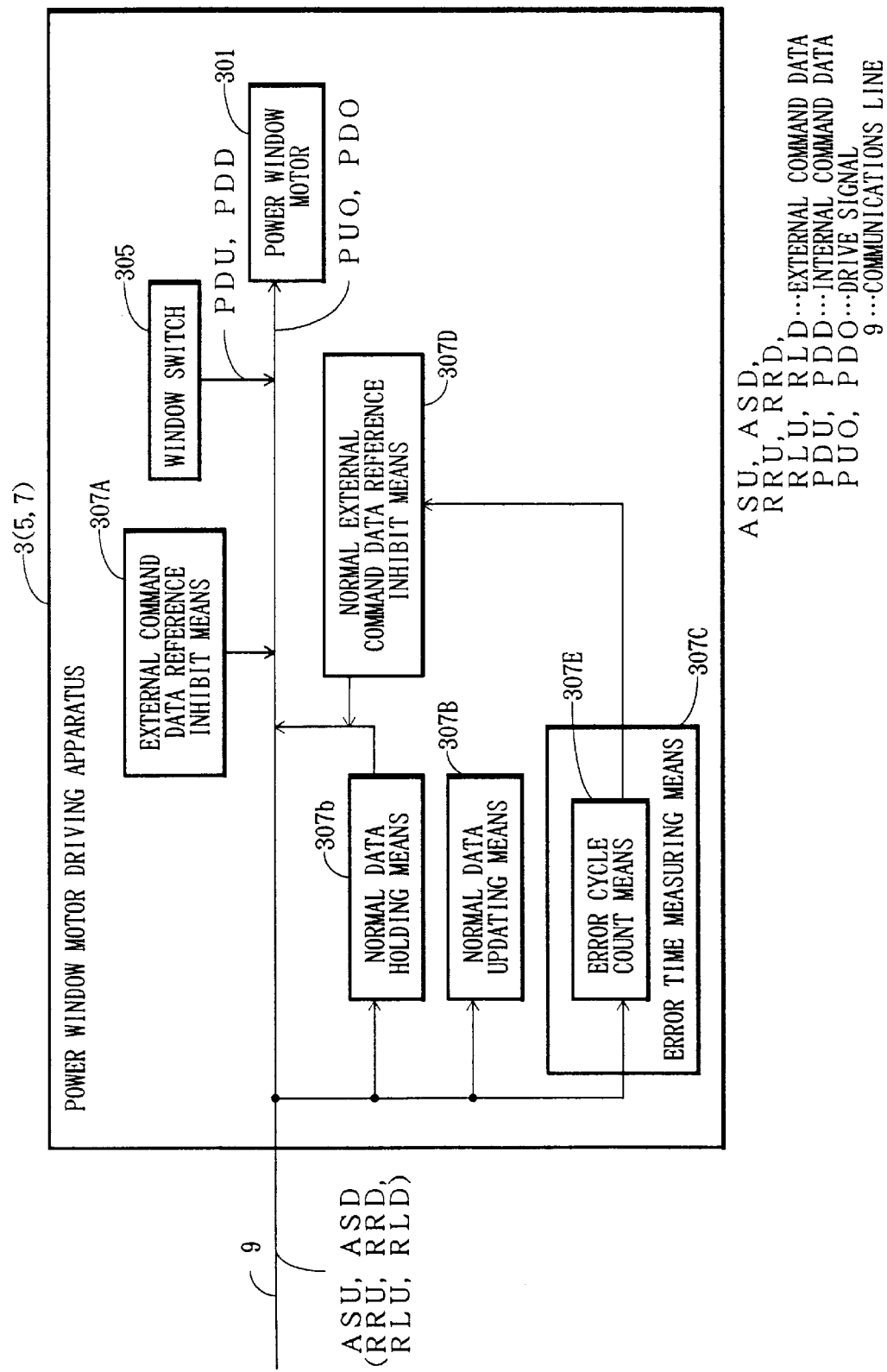
FIG. 1 is a block diagram showing a fundamental configuration of the motor relay driving apparatus of this invention.
Figure 2:
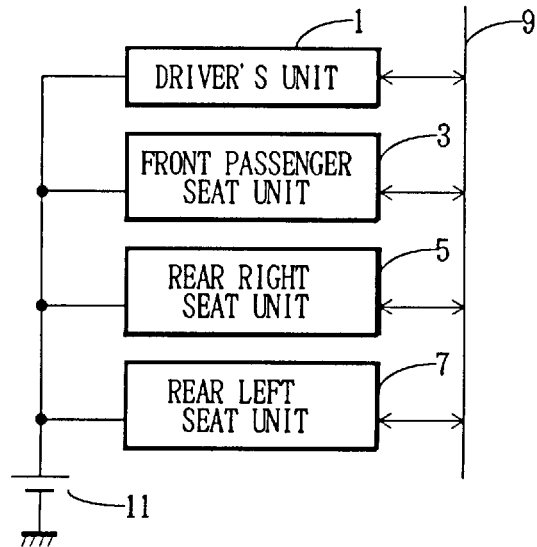
FIG. 2 is a block diagram of an automotive power window system having the power window motor driving apparatus of the prior art for embodying the present invention.

FIG. 2 is a block diagram showing the multiplex communication system for an automotive power window switches having a power window motor driving apparatus as of the prior art for embodying the present invention.

The multiplex communication system for the automotive power window switches of this embodiment includes a driver's seat unit 1 having a transmission function, and a front passenger seat unit 3, a rear right seat unit 5 and a rear left seat unit 7, all three passenger seat unit with a reception function. The units 3–7 for the front passenger seat, the rear right seat and the rear left seat correspond to the power window motor driving apparatuses.

The units 1–7 are interconnected through the multiplex bus line 9 and supplied with electricity from a battery 11 for operation.

The number of units is not limited to four as in this embodiment but may be set to any arbitrary number according to the number of doors or windows that can be opened and closed.

Figure 3:
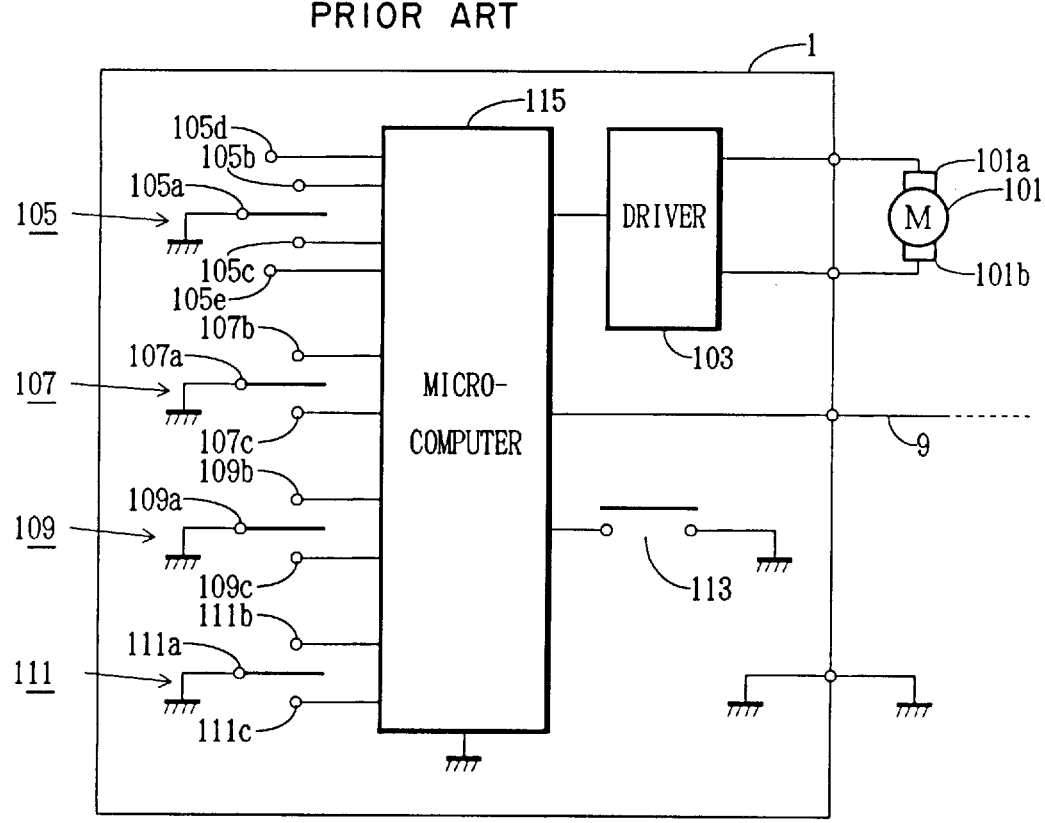
FIG. 3 is a prior art circuit, shown partly in blocks, illustrating an outline configuration of the driver's seat unit of FIG. 2.

The driver's seat unit 1 includes, as shown in FIG. 3, a motor 101 for opening and closing the driver's seat window, a driver 103 having two relays 103a, 103b (see FIG. 4) that switch the terminals 101a, 101b of the motor 101 between the battery 11 side and the ground side, a driver's seat window switch 105, a front passenger seat window switch 107, a rear right seat window switch 109, and rear left seat window switch 111.

The driver's seat unit 1 further includes a window lock switch 113 that nullifies the local switch operations of the units 3–7 at the front passenger seat, rear right seat and rear left seat, and a microcomputer 115 that controls the operation of the motor 101 and the signal transmission through the multiplex bus line 9 to the units 3–7 of the front and rear passenger seats.

The window switches 105–111 are arranged on the door trim or arm rest at the driver's seat together with the window lock switch 113 and a door lock switch for locking (or unlocking) doors (not shown).

The window switches 105–111 each have a seesaw button (not shown), a grounded common contact 105a–111a, and up and down contacts 105b, 105c–111b, 111c connected to the microcomputer 115 and internally pulled up.

The window switches 105–111 operate as follows.

When the seesaw button is not operated, the window switches assume a neutral position, in which the common contact 105a–111a does not contact either the up or down contact 105b, 105c–111b, 111c. When the seesaw button is depressed on the close side, the common contact 105a–111a comes into contact with the up contact 105b–111b. When the seesaw button is depressed on the opposite, open side, the common contact 105a–111a comes into contact with the down contact 105c–111c.

The driver's seat window switch 105 also has an automatic close contact 105d and an automatic open contact 105e, both connected to the microcomputer 115 and internally pulled up.

When the seesaw button is pressed down on the close side or open side to a second depth, deeper than a first depth where the common contact 105a engages the up and down contact 105b, 105c, respectively, the common contact 105a engages the automatic close contact 105d and automatic open contact 105e, respectively, to complete the circuit.

The window lock switch 113, when depressed, holds its internal contact closed and, when depressed again, resets its internal contact to its original open state.

Figure 4:
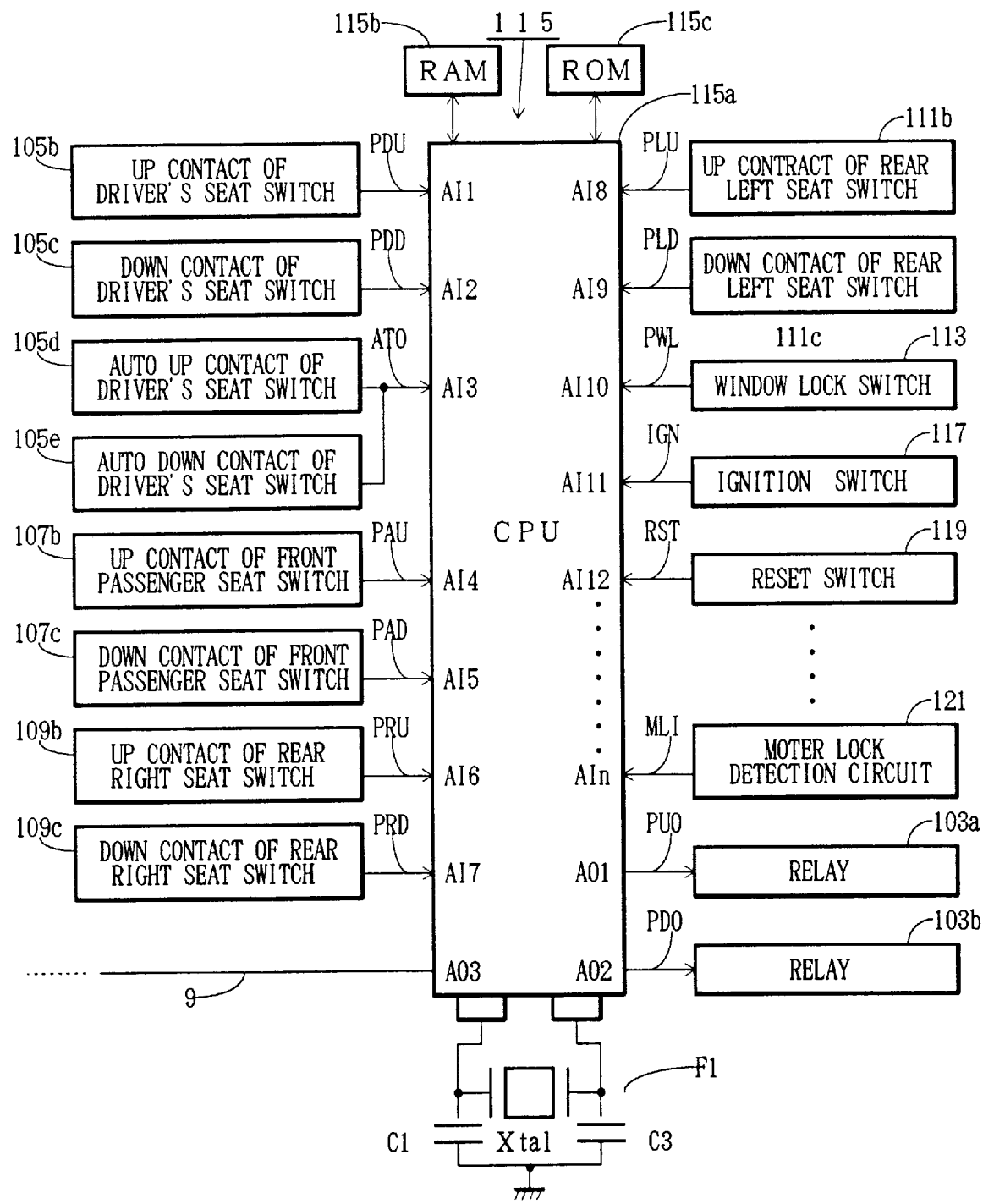
FIG. 4 is a block diagram showing a hardware configuration of the microcomputer of the driver's seat unit of FIG. 3.

The microcomputer 115 drives the motor 101 through the driver 103 according to the operation of the driver's seat window switch 105 and sends data representing the operations of the switches 107–111 for the windows at the front passenger seat, rear right seat and rear left seat, to the units 3–7 of the front passenger seat, rear right seat and rear left seat via the multiplex bus line 9 simultaneously. As shown in FIG. 4, the microcomputer 115 has a CPU (Central Processing Unit) 115a, a RAM (Random Access Memory) 115b, and a ROM (Read-Only Memory) 115c.

The RAM 115b has a data area for storing various data and a work area used for a variety of processing works, and the ROM 115c stores a control program according to which the CPU 115a executes various processing operations.

The CPU 115a has input ports AI1–AIn and output ports AO1–AO3. The input ports AI1, AI2 are connected with up and down contacts 105b, 105c of the driver's seat window switch 105, respectively, and the input port AI3 is connected with both the auto up and auto down contacts 105d, 105e.

The input ports AI4–AI9 of the CPU 115a are connected with the up and down contacts 107b, 107c–111b, 111c of the window switches 107–111 at the front passenger seat, rear right seat and rear left seat. The input port AI10 is connected with the window lock switch 113.

Further, the input port AI11 is connected with an ignition switch 117 arranged near the steering wheel (not shown); the input port AI12 is connected with a reset switch 119 of the CPU 115a; and the input port AIn is connected with a motor lock detection circuit 121 that detects an overload condition of the locked motor 101 from the current flowing in the motor 101.

An input signal IGN to the input port AI11 goes high when the internal contact of the ignition switch 117 is closed and goes low when open.

An input signal PWL to the input port AI10 goes high when the input signal IGN of the input port AI11 is low, or when the input signal IGN is high and the internal contact of the window lock switch 113 is open. The input signal PWL goes low when the input signal IGN is high and the internal contact of the window lock switch 113 is closed.

The input signal MLI to the input port AIn goes low when the motor 101 is locked and high when not locked.

Input signals PDU, PAU, PRU, PLU to the input ports AI1, AI4, AI6, AI8 go high when the input signal IGN to the input port AI11 is low or when the input signal PWL to the input port AI10 is low, or when both the input signals IGN, PWL are high and the common contacts 105a–111a and up contacts 105b–111b of the window switches 105–111 of the driver's seat, front passenger seat, rear right seat and rear left seat are open. These input signals PDU, PAU, PRU, PLU go low when both the input signals IGn, PWL are high and the common contacts 105a–111a and up contacts 105b–111b of the window switches 105–111 are closed.

Input signals PDD, PAD, PRD, PLD to the input ports AI2, AI5, AI7, AI9 go high when the input signal IGN to the input port AI11 is low, or when the input signal PWL to the input port AI10 is low, or when both the input signals IGN, PWL are high and the common contacts 105a–111a and down contacts 105c–111c of the window switches 105–111 of the driver's seat, front passenger seat, rear right seat and rear left seat are open. These input ports AI2, AI5, AI7, AI9 go low when the input signals IGN, PWL are both high and the common contact 105a–111a and down contact 105c–111c of the window switches 105–111 are closed.

An input signal ATO of the input port AI3 goes high when the input signal IGN to the input port AI11 is low, or when the input signal PWL to the input port AI10 is low, or when the input signals IGN, PWL are both high and the common contact 105a and the auto up and auto down contacts 105d, 105e are open. This input signal ATO goes low when both the input signals IGN, PWL are high and the common contact 105a and the auto up and auto down contacts 105d, 105e are closed.

An input signal RST to the input port AI12 goes low when the reset switch 119 is operated and high when not operated.

Output ports AO1, A02 are connected with relays 103a, 103b of the driver 103, and an output port A03 is connected with the multiplex bus line 9.

An output signal PUO of the output port AO1 goes high when an input signal RST to the input port AI12 is high and an input signal PDU to the input port AI1 is low. The output signal PUO also goes high in the period of 0.7+0.2 seconds or until the input signal PDD to the input port AI2 changes from high level to low level after the input signal ATO to the input port AI3 has made a high-to-low transition and the input signal MLI to the input port AIn has made a high-to-low transition, with the input signal RST to the input port AI12 held high and the input signal PDU held low. In other periods, the output signal PUO goes low.

Similarly, an output signal PDO of the output port A02 goes high when an input signal RST to the input port AI12 is high and an input signal PDD to the input port AI2 is low. The output signal PDO also goes high in the period of 0.7±0.2 seconds or until the input signal PDU to the input port AI1 changes from high level to low level after the input signal ATO to the input port AI3 has made a high-to-low transition and the input signal MLI to the input port AIn has made a high-to-low transition, with the input signal RST to the input port AI12 held high and the input signal PDD held low. In other periods, the output signal PDO goes low.

The CPU 115a is also connected with an oscillation circuit F1 having capacitors C1, C3 and a quartz oscillator Xta1. In this embodiment, the oscillation circuit Fl is designed to produce a signal of oscillation frequency f1=4 MHz for C1=C3=20 pF.

The input signals entered to the input ports AI1–AIn are filtered by the CPU 115a.

This filtering operation is described in detail. The signal entered to the input ports AI1–AIn are sampled in clock cycles of 32 msec. When the signal value remains the same at two consecutive sampling cycles, the value is read in as a normal signal value. When the signal value differs at two consecutive sampling cycles, the previous signal value is held.

The correspondence between the input signal before being filtered and the one after being filtered is shown in FIG. 5A and 5B.

The character configuration for data transmission from the driver's seat unit 1 to the units 3–7 of the front passenger seat, rear right seat and rear left seat through the multiplex bus line 9 consists, as shown in FIG. 6, of a start bit, 7 bits of data B0–B7, and a stop bit. In this embodiment, a character cycle Tcy is set to 32 msec and a character time Tc is set to 6.144–9.216 msec. An idle time Tci is given by subtracting the character time Tc from the character cycle Tcy, i.e., the remaining maximum 25.856 msec.

The format of the start bit, as shown in FIG. 7A, is a high-level signal of 1536 #sec and that of the stop bit is a low-level signal of 1536 gsec as shown in FIG. 7B.

As to the bit format of data B0, B2, B4, B6, as shown in FIG. 7C, data "0" corresponding to the nonactive state is a low-level signal of 768 gsec and data "1" corresponding to the active state is a low-level signal of 384 $\mu$sec.

As to the bit format of data B1, B3, B5, B7, as shown in FIG. 7D, data "0" corresponding to the non-active state is a high-level signal of 384 gsec and data "1" corresponding to the active state is a high-level signal of 768 $\mu$sec.

The format of the character data BO–B7, as shown in FIG. 8, consists of, from the most significant bit to the least significant bit, a front passenger seat window UP (ASU), a front passenger seat window DOWN (ASD), a rear right seat window UP (RRU), a rear right seat window DOWN (RRD), rear left seat window UP (RLU), a rear left seat window DOWN (RLD), a window lock (PLO), and a parity (PAR). Of these bits, data excluding PLO and PAR correspond to the external command data that appears in the claim.

The PAR used is an even parity.

The ASU and ASD become data "0" when the input signals PAU, PAD to the input ports AI4, AI5 of the CPU 115a are high, and data "1" when the input signals PAU, PAD are low. The RRU and RRD become data "0" when the input signals PRU, PRD to the input ports AI6, AI7 of the CPU 115a are high, and data "1" when input signals PRU, PRD are low.

Similarly, the RLU and RLD become data "0" when the input signals PLU, PLD to the input ports AI8, AI9 of the CPU 115a are high, and data "1" when the input signals PLU, PLD are low. The PLO become data "1" when the input signal PWL to the input port AI10 of the CPU 115a is low, and data "0" when input signal PWL is high.

The front passenger seat unit 3, the rear right seat unit 5 and the rear left seat unit 7 are basically the same in configuration.

Figure 9:
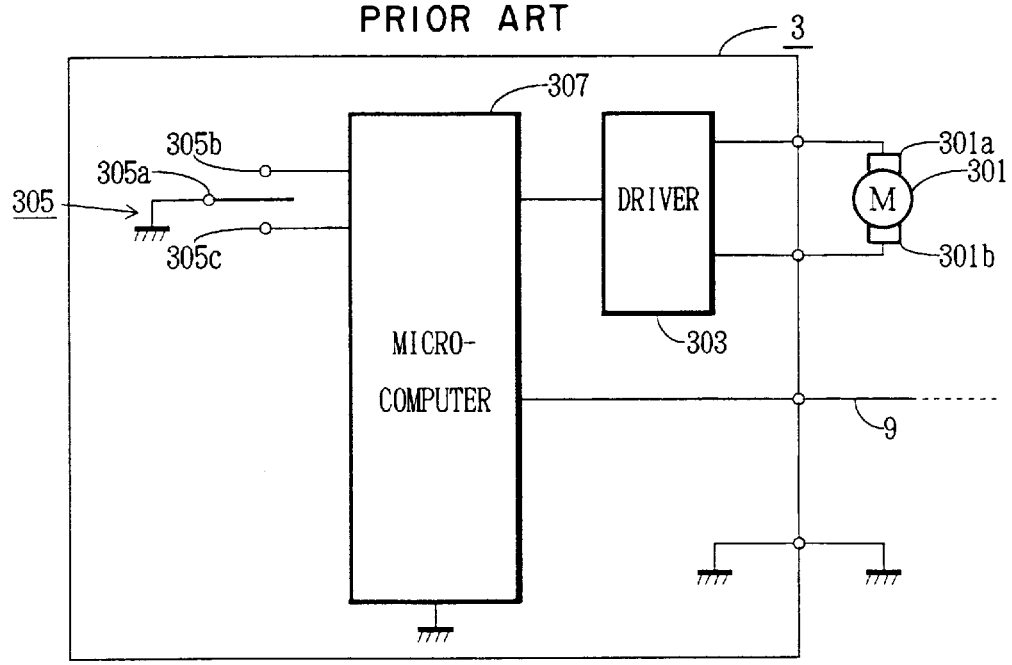
FIG. 9 is a prior art circuit, shown partly in blocks, illustrating an outline configuration of the front passenger seat unit, which is the same as those of the rear right seat unit and the rear left seat unit of FIG. 2.

As representatively shown by the front passenger seat unit 3 of FIG. 9, these units 3–7 each include a motor 301 for opening and closing their own window, a driver 303 having two relays 303a, 303b (FIG. 10) that switch the terminals 301a, 301b of the motor 301 between the battery 11 side and the ground side, a local switch 305 for their own window, and a microcomputer 307 that controls the operation of the motor 301 and reception of the data sent from the driver's seat unit 1 through the multiplex bus line 9.

The window switch 305 is provided on the door trim or arm rest of the front passenger seat, rear right seat and rear left seat.

The window switch 305 has a seesaw button (not shown), a grounded common contact 305a, and up and down contacts 305b, 305c connected to the microcomputer 307 and internally pulled up.

When the seesaw button is not operated, the window switch 305 assumes a neutral position, in which the common contact 305a does not contact either the up or down contact 305b, 305c. When the seesaw button is depressed on the close side, the common contact 305a comes into contact with the up contact 305b. When the seesaw button is depressed on the opposite, open side, the common contact 305a comes into contact with the down contact 305c.

Figure 10:
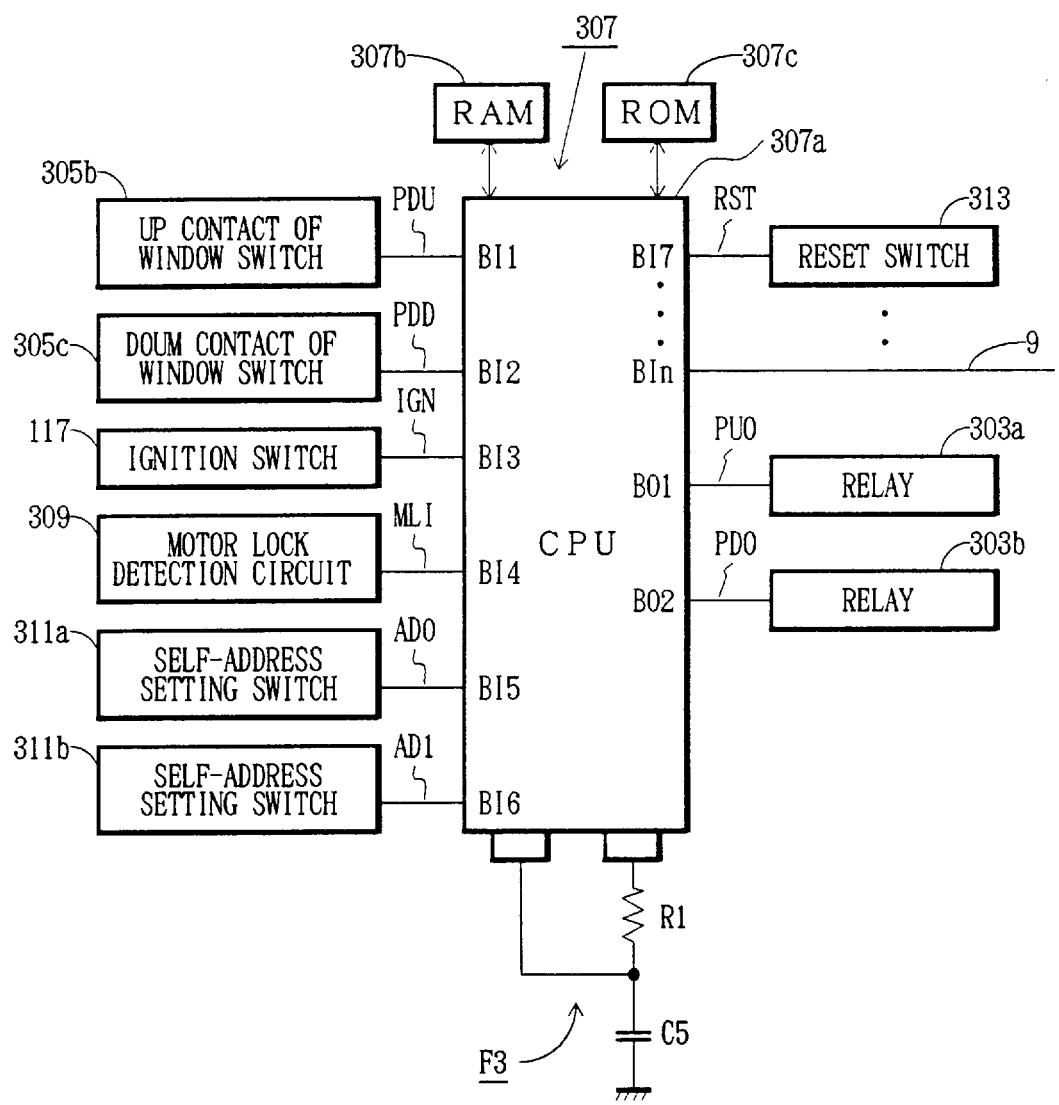
FIG. 10 is a block diagram showing a hardware configuration of the microcomputer of the front passenger seat unit, which is the same as those of the rear right seat unit and the rear left seat unit of FIG. 3.

The microcomputer 307 receives data representing the operation of the window switches 107–111 transmitted from the driver's seat unit 1 through the multiplex bus line 9 and extracts a part of the data that is related to its own unit. According to the extracted data and the operation of the window switch 305, the microcomputer 307 drives the motor 301 through the'driver 303. As shown in FIG. 10, the microcomputer 307 comprises a CPU 307a, a RAM 307b and a ROM 307c.

The RAM 307b, as shown by the area map of FIG. 11, has a data area for storing a variety of data and a work area used for various processing works. The data area has a decision table area used to detect bits of transmitted data from the driver's seat unit 1 and the work area has an idle flag area, an idle timer area, an error counter area, and a previous reception data buffer area. The previous reception data buffer area corresponds to a normal data holding means described in the claim.

The ROM 307c stores a control program according to which the CPU 307a performs a variety of processing.

The CPU 307a, as shown in FIG. 10, has input ports BI1–BIn and output ports BO1, B02. Of these, the input ports BI1, BI2 are connected with the up and down contact 305b, 305c of the window switch 305, the input port BI3 is connected with the ignition switch 117, and the input port BI4 is connected with a motor lock detection circuit 309 that detects the overload condition of the locked motor 301 from the current flowing in the motor 301.

The input ports BI5, BI6 are connected with self-address setting switches 311a, 311b, the input port BI7 is connected with a reset switch 313 of the CPU 307a, and the input port BIn is connected with the multiplex bus line 9.

The input signal IGN to the input port BI3 goes high when the internal contact of the ignition switch 117 is closed, and low when it is open.

The input signal MLI of the input port BI4 goes low when the motor 301 is locked, and high when it is not locked.

The input signal PDU to the input port BI1 goes high when the input signal IGN to the input port BI3 is low or when the input signal IGN is high and the common contact 305a and up contact 305b of the window switch 305 are open. The input signal PDU goes low when the input signal IGN is high and the common contact 305a and up contact 305b of the window switch 305 are closed.

The input signal PDD to the input port BI2 goes high when the input signal IGN to the input port BI3 is low or when the input signal IGN is high and the common contact 305a and down contact 305c of the window switch 305 are open. The input signal PDD goes low when the input signal IGN is high and the common contact 305a and down contact 305c of the window switch 305 are closed.

The input signal RST to the input port BI7 goes low when the reset switch 313 is operated, and high when it is not operated.

The input signals AD0, AD1 to the input ports BI5, BI6 go low when the self-address setting switches 311a, 311b are operated, and high when they are not operated.

In this embodiment, the allocation of the self addresses set by the self-address setting switches 311a, 311b of the front passenger seat unit 3, rear right seat unit 5 and rear left seat unit 7 is as shown in FIG. 12, in which the front passenger seat unit 3 has AD0="low" and AD1="low," the rear right seat unit 5 has AD0="high" and AD1="low," and the rear left seat unit 7 has AD0="high" and AD1="high." Hence, when the input signals AD0, AD1 from the self-address setting switches 311a, 311b are AD0="low" and AD1="high," an address error results.

When the input signals AD0, AD1 to the input ports BI5, BI6 in FIG. 10 are "low" and "low," respectively, which corresponds to the setting for the front passenger seat unit 3, the data—the ASU and ASD for moving the front passenger seat window up or down and the PLO—of the transmitted data from the driver's seat unit 1 received in the input port BIn through the multiplex bus line 9 are checked for the active or nonactive state.

When the input signals AD0, AD1 are "high" and "low," respectively, which corresponds to the setting for the rear right seat unit 5, the data—the RRU and RRD for moving the rear right seat window up or down and the PLO—of the transmitted data are checked for the active or nonactive state.

Further, when the input signals AD0, AD1 are "high" and "high," respectively, which corresponds to the setting for the rear left seat unit 7, the data—the RLU and RLD for moving the rear left seat window up or down and the PLO—of the transmitted data are checked for the active or nonactive state.

The output ports B01, B02 are connected with two relays 303a, 303b of the driver 303, to which high-active output signals PUO, PDO (which correspond to power window motor drive signals) are output from the output ports BO1, B02.

The CPU 307a is connected with a CR oscillation circuit F3 that consists of a capacitor C5 and a resistor R1. In this embodiment the CR oscillation circuit F3 is designed to oscillate a signal with an oscillation frequency of F3=125 kHz.

Figure 13:
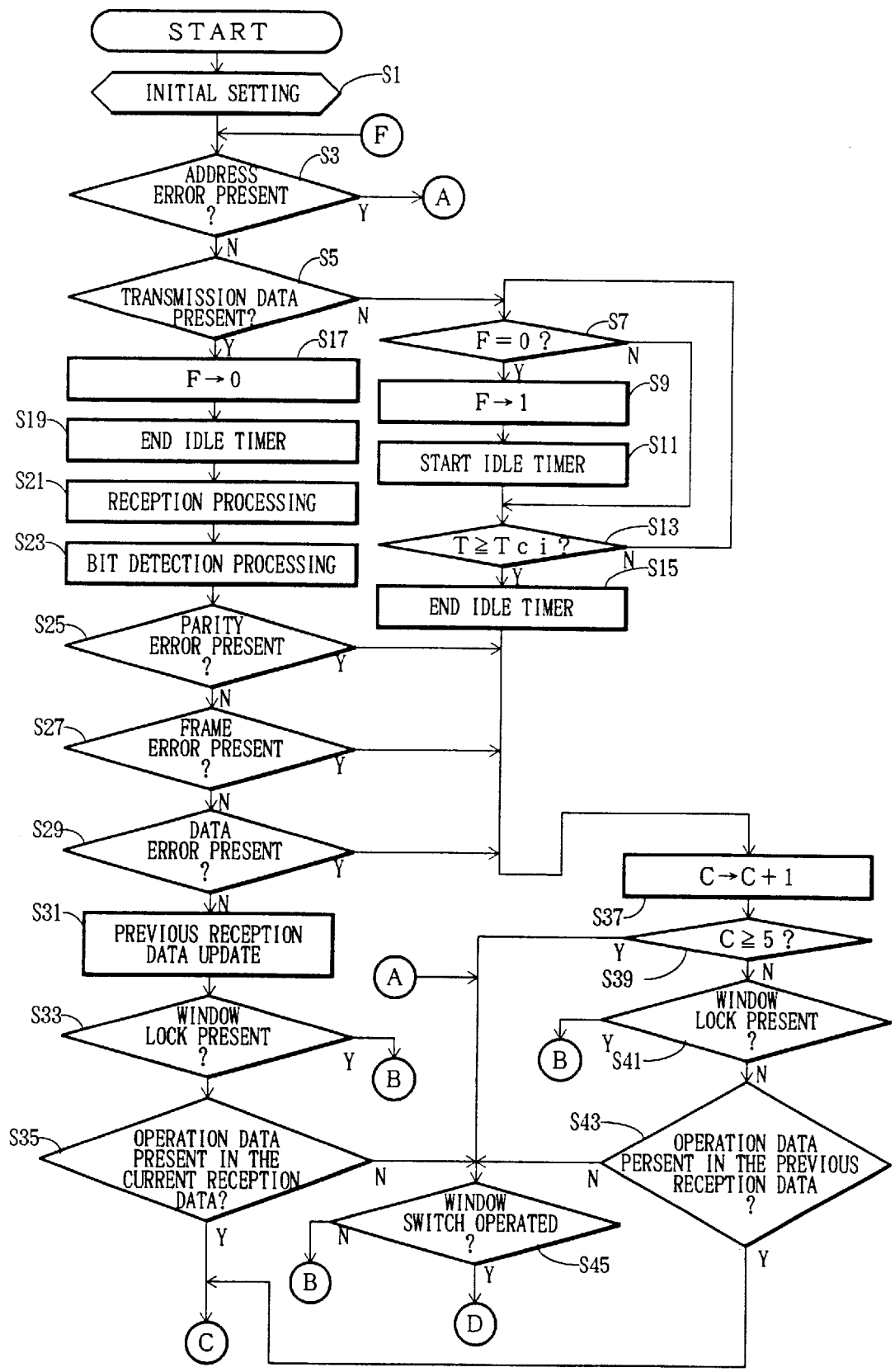
FIG. 13 is a flow chart showing the processing performed by the CPU according to a control program stored in the ROM of the microcomputer of FIG. 10.
Figure 14:
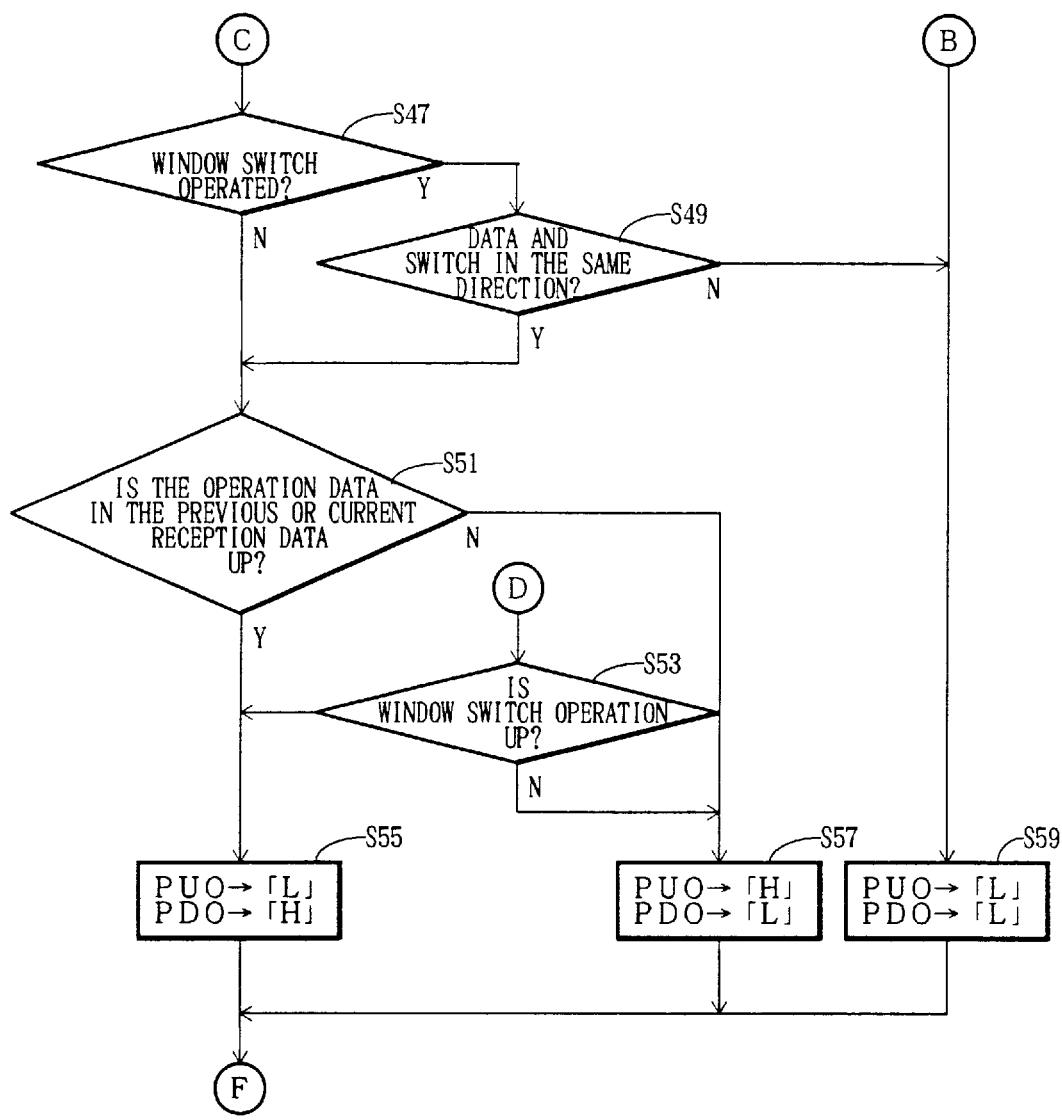
FIG. 14 is a flow chart showing the processing performed by the CPU according to a control program stored in the ROM of the microcomputer of FIG. 10.

Next, the processing that the CPU 307a performs according to the control program stored in the ROM 307c is explained by referring to the flow charts of FIG. 13 and 14.

The CPU 307a starts processing upon power up and performs the initial setting as shown in FIG. 13 (step S1).

The initial setting involves setting "0" in the idle flag F in the idle flag area of the RAM 307b, resetting the count time T of the idle timer in the idle timer area and the count value C of the error counter in the error counter area to zero, and clearing the previous reception data stored in the previous reception data buffer area. Next, it is checked whether the input signals AD0, AD1 from the self-address setting switches 311a, 311b entered into the input ports BI5, BI6 are "low" and "high" (step S3). If AD0 and AD1 are "low" and "high" respectively (step 3, Y), the processing proceeds to step S43 described later. When AD0 and AD1 are not "low" and "high" respectively (step S3, N), the processing proceeds to step S5.

The step S5 checks if any transmission data from the driver's seat unit 1 is entered into the input port BIn through the multiplex bus line 9. When the data is found not entered (step S5, N), the program checks whether the idle flag F in the idle flag area of the RAM 307b is "0" or not (step S7).

When the idle flag F is not "0" (step S7, N), the program moves to step S13 to be described later. When the idle flag F is "0" (step S7, Y), the CPU sets "1" in the idle flag F (step S9) and starts time count by the idle timer of the RAM 307b (step S1) before moving to step S13.

The step S13 checks if the count time T of the idle timer has reached the idle time Tci. If the count time is not reached (step S13, N), the program returns to step S7. When reached (step S13, Y), the program ends the time count by the idle timer, resets the count time T to zero (step S15) before moving to step S37.

When the step S5 finds that the transmission data from the driver's seat unit 1 is entered into the input port BIn through the multiplex bus line 9 (Y), the CPU sets "0" in the idle flag F (step S17), ends the time count by the idle timer, resets the count time T to zero (step S19) and filters the transmission data entered into the input port BIn, thus performing the reception processing to transform the transmission data into reception data (step S21).

The reception processing is a filtering processing whereby the reception signal level assigned to each pattern is read in as a normal signal level of the reception data, depending on which of the predetermined patterns the input level of the input port BIn sampled at predetermined clocks for a specified number of consecutive cycles matches. Whether this processing is done or not is arbitrarily set.

Step S23 following the reception processing of step S21 performs a bit detection processing that detects bits of the reception data which was obtained by filtering the transmission data from the driver's seat unit 1.

The bit detection processing samples the signal level of the reception data a predetermined time after the leading edge of the reception data (up to three samplings: first sampling=112 gsec after, second sampling=560 $\mu$sec after and third sampling=1136 $\mu$sec after) and, according to the pattern of the signal level at each sampling, determines the start bit and stop bit and also the data bits "0" and "1."

The bit detection processing is detailed in the following. The detection of the first start bit is performed by referencing the result of up to three samplings. If all sampling results are "low," then the bit is determined to be a start bit.

The data detection from the next 1st bit to 8th bit is done by performing up to two samplings. When the first sampling is "high" and the second sampling is also "high," then the two-sampling data portion is taken to be "0." If the second sampling is "low," the first-sampling data portion is recognized as data "1."

Further, if the first sampling is "low" and the second is also "low," the two-sampling data portion is taken to be data "1." If the second sampling is "high," the first-sampling data portion is taken as data "0."

The detection of the last stop bit is done in the similar manner to the start bit by referencing the results of up to three samplings. If all three samplings are "high," the data is determined as a stop bit.

The sampling timing for the detection of each bit is shown in FIG. 15. The decision table for determining the bits from the sampled data is shown in FIG. 16.

The step S25, S27 and S29 following the bit detection processing of step S23 check for parity error, frame error and data error for each frame, according to the decision results of the start bit and stop bit, the decision results of data bits "0" or "1" and the levels of input signals AD0, AD1 to the input ports BI5, BI6, i.e., the set addresses.

The parity error is checked by comparing the parity calculated from the reception data that has undergone the reception processing and the filtering with the parity in the parity bit of the reception data. When they agree, the parity error decision is "none."

The frame error is detected by checking the number of bits detected by the bit detection processing. The data error is detected by checking whether or not the two data related to the operation of the window are both active, i.e., ASU and ASD in the case of the front passenger seat unit 3, RRU and RRD in the case of the rear right seat unit 5, and RLU and RLD in the case of the rear left seat unit 7. Then if these two data are both active, the decision of the data error is "present."

If any of the parity error, frame error and data error exists (at least one of steps S25, S27 and S29 has resulted in Y), the program moves to step S37. When no error exists at all (all the steps S25, S27 and S29 have resulted in N), the CPU updates the previous reception data stored in the previous reception data buffer area to the current reception data that has undergone the reception processing of step S21 and the bit detection processing of step S23 (step S31).

Next, based on whether the PLO in the present reception data is active or not, the presence or absence of window lock is checked (step S33). If the contents of PLO are active, representing the window lock (step S33, Y), the program proceeds to step S59 to be described later. When the contents of PLO are nonactive indicating that the window is not locked (step S33, N), the program checks if the present reception data has operation data for opening or closing the window of the unit of interest (step S35).

When the present reception data does not contain the window operation data (step S35, N), the program moves to step S45 to be described later. When there is window operation data (step S35, Y), the program moves to step S47.

After the count time T of the idle timer has reached the idle time Tci in step S13 (Y) ending the time count by the idle timer at step S15 and resetting the count time T to zero, or when any of the parity error, frame error and data error is detected (Y at least at step S25, S27, S29), the program moves to step S37 where it increments the count value C of the error counter by one and then (at step S39) checks whether this count value C has reached five.

When the count value C reaches five (step S39, Y), the program moves to step S45. When five is not reached (step S39, N), the program checks whether or not the PLO in the previous reception data stored in the previous reception data buffer area is active, to determine the presence or absence of window lock in the previous reception data (step S41).

When there is a window lock in the previous reception data (step S41, Y), the program moves to step S59. When the window is not locked (step S41, N), it is checked whether the previous reception data contains data for operating the window of the unit in question (step S43).

When the window operation data for the unit is not contained in the previous reception data (step S43, N), the program proceeds to step S45. When the window operation data exists (step S43, Y), program moves to step S47.

In step S45—to which the program moves when the window operation data for the unit being considered is found not contained in the present reception data (at step S35, N), when the count value C reaches "5" (step S39, Y), or when the window operation data for the unit is found not contained in the previous reception data (at step S43, N)—the program determines if the window switch 305 was operated or not according to whether the input signals PDU, PDD to the input ports BI1, BI2 are both nonactive.

When one of the input signals PDU, PDD is found not nonactive and the window switch 305 is operated (step S45, Y), the program proceeds to step 53 described later. When both the input signals PDU, PDD are found nonactive and the window switch 305 is not operated (step S45, N), the program moves to step S59.

In step S47—to which the program moves when the window operation data for the unit in question exists in the present reception data (step S35, Y) or when the window operation data for the unit exists in the previous reception data (step S43, Y)—is checked whether or not the window switch 305 is operated, as in step S45 of FIG. 13.

When the window switch 305 is found operated (step 47, Y), the check is made to see whether the up/down operation direction of the operated window is the same as he up/down operation direction contained in the window operation data for the unit found at step S35 and step 43 (step S49). When the up/down directions differ (step 49, N), the program moves to step S59. When they agree step S49, Y), the program moves to step S51.

In the step S47, when the window switch 305 is found not operated (N), the program moves to step S51.

The step S51 checks whether the up/down operation directions of the unit's own window contained in the window operation data found at step S35 and step S43 are "up" (step S51). When the operation directions are "up" (step S51, Y), the program proceeds to step S55 to be described later. When the directions are not "up" (step S51, N), the program moves to step S57.

In step S53—to which the program moves when the window switch 305 is operated (step S45, Y)—the check is made to see if the window switch 305 is operated in the "up" direction. If so (step S53, Y), the program moves to step S55 and, if not (step S53, N), moves to step S57.

In step S55—to which the program moves when the up/down operation directions of the unit's own window contained in the window operation data found at step S35 and step S43 are "up" (step S51, Y), or when the window switch 305 is found operated in the "up" direction (step S53, Y)—the output signals PUO, PDO output from the output ports BO1, B02 to the relays 303a, 303b are set to "low" and "high," respectively, to cause the motor 301 to turn in the "window up" direction. Then the program returns to step S3.

In step S57—to which the program moves when the up/down operation directions of the unit's own window contained in the window operation data found at step S35 and step S43 are not "up" (step S51, N), or when the window switch 305 is found not operated in the "up" direction (step S53, N)—the output signals PUO, PDO output from the output ports BO1, B02 to the relays 303a, 303b are set to "high" and "low," respectively, to cause the motor 301 to turn in the "window down" direction. Then the program returns to step S3.

Further, in step S59—to which the program moves when the window lock is found in the present reception data (step S33, Y) or in the previous reception data (step S41, Y), when the window switch 305 is not operated (step S45, N), or when the up/down operation direction of the window switch 305, whose operation was confirmed by step S45, does not agree with the up/down operation direction of the unit's own window contained in the window operation data found at step S35 and step S43 (step S49, N)—the output signals PUO, PDO output from the output ports B01, B02 to the relays 303a, 303b are set to "low," to stop the motor 301. Then the program returns to step S3.

As can be seen from the foregoing description, in this embodiment, an external command data reference inhibit means 307A in the claim is made up of step S3 and step S39 in the flow chart of FIG. 13; a normal data updating means 307B is formed by the step S31 in FIG. 13; and a normal external command data reference inhibit means 307D is formed by the step S39 in FIG. 13.

In this embodiment, an error cycle count means 307E is formed by the step S37 in FIG. 13. This error cycle count means 307E and the step S39 of FIG. 13 make up an error time measuring means 307C.

Next, the operation (action) of the units 3–7 of the front passenger seat, rear right seat and rear left seat according to this invention is explained. Here, we will pick up the front passenger seat unit 3 as a representative in the following description.

The front passenger seat unit 3 is activated when the ignition switch 117 is closed. Its operation differs among the following five states, the first to fifth state, and also according to whether in each state the reception data received from the driver's seat unit 1 through the multiplex bus line 9 has data errors such as reception failure and invalidation of data.

In the first state in which neither the front passenger seat window switch 107 and the window lock switch 113 in the driver's seat unit 1 nor the window switch 305 in the front passenger seat unit 3 is operated, the terminals 301a, 301b of the motor 301 are both connected to the ground by the relays 303a, 303b of the driver 303, so that the motor 301 is not energized and the front passenger seat window is not operated at all whether or not there are data errors in the reception data from the driver's seat unit 1.

Next, in the second state in which neither the front passenger seat window switch 107 nor the window lock switch 113 in the driver's seat unit 1 is operated and only the local window switch 305 in the front passenger seat unit 3 is operated, one of the terminals 301a, 301b of the motor 301 is connected to the ground and the other to the battery 11 by the relays 303a, 303b of the driver 303, causing the motor 301 to turn forward or backward to open or close the front passenger seat window according to the operation of the local window switch 305 whether or not there are data errors in the reception data from the driver's seat unit 1.

Next, in the third state in which neither the window lock switch 113 in the driver's seat unit 1 nor the local window switch 305 in the front passenger seat unit 3 is operated and only the front passenger seat window switch 107 in the driver's seat unit 1 is operated, if there is no data error in the reception data from the driver's seat unit 1, one of the terminals 301a, 301b of the motor 301 is connected to the ground and the other to the battery 11, causing the motor 301 to turn forward or backward to open or close the front passenger seat window according to the operation of the front passenger seat window switch 107.

Then, when a data error occurs in the reception data from the driver's seat unit 1, the opening or closing of the front passenger seat window dictated by the front passenger seat window switch 107 that was being operated immediately before the data error occurred continues to be performed. Then, with the elapse of 160 msec, which is equal to 32 msec×5 times, i.e., the reception period of the reception data from the driver's seat unit 1, the terminals 301a, 301b of the motor 301 are both connected to the ground, deenergizing the motor 301 to stop the operation of the front passenger seat window.

When, at a point 160 msec after the data error occurred in the reception data from the driver's seat unit 1, the local window switch 305 in the front passenger seat unit 3 is operated, one of the terminals 301a, 301b of the motor 301 is connected to the ground and the other to the battery 11 by the relays 303a, 303b of the driver 303, causing the motor 301 to rotate forwardly or reversely to open or close the front passenger seat window according to the operation of the local window switch 305.

If there is no reception data from the driver's seat unit 1 during the period after the ignition switch 117 has been closed until a data error occurs, the front passenger seat window is operated only according to the operation of the local window switch 305 of the front passenger seat unit 3.

Next, in the fourth state in which the window lock switch 113 in the driver's seat unit 1 is not operated and in which both the front passenger seat window switch 107 in the driver's seat unit 1 and the local window switch 305 in the front passenger seat unit 3 are operated; if there is no data error in the reception data from the driver's seat unit 1 and only when the operation directions of the front passenger seat window switch 107 and the local window switch 305 are the same, one of the terminals 301*a*, 301*b* of the motor 301 is connected to the ground and the other to the battery 11 by the relays 303*a*, 303*b* of the driver 303, causing the motor 301 to turn forwardly or backwardly according to the pattern of the switch operation direction to open or close the front passenger seat window according to the operation of the front passenger seat window switch 107 and the window switch 305.

If, when there is no data error, the front passenger seat window switch 107 and the window switch 305 are operated in the opposite directions, the terminals 301*a*, 301*b* of the motor 301 are both connected to the ground by the relays 303*a*, 303*b* of the driver 303, with the result that the front passenger seat window is not operated at all.

With the front passenger seat window switch 107 and the local window switch 305 operated in the same direction and with the front passenger seat window being opened or closed according to the direction of switch operations, when a data error occurs in the reception data from the driver's seat unit 1, the opening or closing of the front passenger seat window dictated by the front passenger seat window switch 107 and the local window switch 305 that was being operated immediately before the data error occurred continues to be performed.

When during the switch operation the local window switch 305 is reversed, the operation direction of the local window switch 305 becomes opposite to that of the front passenger seat window switch 107 that was being operated immediately before the data error occurred in the reception data, so that the terminals 301*a*, 301*b* of the motor 301 are both connected to the ground, deenergizing the motor 301 and stopping the operation of the front passenger seat window.

Next, in the fifth state in which the window lock switch 113 of the driver's seat unit 1 is operated, if no data error occurs in the reception data from the driver's seat unit 1, the terminals 301*a*, 301*b* of the motor 301 are both connected to the ground by the relays 303*a*, 303*b* of the driver 303, deenergizing the motor 301 and preventing the operation of the front passenger seat window, regardless of whether the front passenger seat window switch 107 in the driver's seat unit 1 or the local window switch 305 in the front passenger seat unit 3 is operated or not.

If in this state a data error occurs in the reception data from the driver's seat unit 1, the subsequent operation remains the same as that before the occurrence of the data error, i.e., no electricity is supplied to the motor 301 and the front passenger seat window is not operated. Because the ALO representing the operation of the window lock switch 113 is not taken into the CPU 307*a* due to data error in the reception data, operating the local window switch 305 of the front passenger seat unit 3 energizes the motor 301 causing the front passenger seat window to be operated according to the operation of the window switch 305.

The operation (action) of the front passenger seat unit 3 as a representative example of the front passenger seat unit,
rear right seat unit and rear left seat unit 3-7 has been described above. The rear right seat unit 5 and the rear left seat unit 7 have operations (actions) similar to that of the front passenger seat unit 3, except that the front passenger seat window switch 107 is replaced with the rear right seat window switch 109 or the rear left seat window switch 111 and that the front passenger seat unit 3 is replaced with the rear right seat unit 5 or the rear left seat unit 7.

With the front passenger seat unit 3, the rear right seat unit 5 and the rear left seat unit 7 of this embodiment, even when data errors occur in the reception data from the driver's seat unit 1, the local window switches 305 for the units 3-7 are not nullified but remain effective preventing the associated windows from being rendered inoperable.

In this embodiment, when a data error occurs, the motor 301 is driven by referencing the previous reception data in the previous reception data register area, i.e., the reception data during the normal state immediately before the occurrence of the data error, and also the contents of operation of the local window switch 305 of the unit of interest, so that, when a data error is generated only for a moment, the opening or closing operation of the window is allowed to continue without any apparent change in the same way as before the occurrence of the data error.

Further, it is noted that the details of data frames, cycle time, data format, data sampling cycle, and data transmission and reception processing performed by the front passenger seat unit 3, the rear right seat unit 5 and the rear left seat unit 7 including reception data error detection and processing other than the window operations during the data error, are not limited to those of this embodiment but may be arbitrarily determined.

It is possible to eliminate the circuit that generates a power window motor drive signal by referencing the normal external command data received immediately before the occurrence of data error, together with the operation contents of the window switch at the time of the data error.

When the above-mentioned circuit that generates the drive signal by referencing the normal external command data in the event of data error is to be provided, the time that elapses from the occurrence of data error to the moment the normal external command data reference inhibit means 307D begins to inhibit the referencing of the normal external command data is not limited to a time that is proportional to the cycles of sampling the normal external command data. It may be set to an arbitrary time that is obtained by the counting of a timer triggered by a data error. Or the referencing may be made without any time limitation.

As described above, in a power window motor driving apparatus, which generates a drive signal for a power window motor based on internal command data internally generated by the operation of a window switch and on external command data received from outside through a communications line, and which, in the event that a data error occurs in the external command data, limits the generation of the drive signal; this invention provides the power window motor driving apparatus, which comprises: an external command data reference inhibit means which, in the event that a data error occurs in the external command data, inhibits only the generation of the drive signal based on the external command data.

Therefore, in the event of data errors such as external command data reception failure and invalidation of data due to communications line failure, communication anomaly or noise, even when the communications line is a single line rather than a dual line and no backup line is provided, it is still possible to open or close the window by the window switch operation.

What is claimed is:

1. A power window motor driving apparatus for use in a vehicle, which is related to an open-close controlling operation of the windows at passenger seats other than a driver's seat, and generates a drive signal for a power window motor based on internal command data internally generated by the operation of a window switch at each of the passenger seats and on external command data received from the driver's seat through a communications line, and which, whenever any data error occurs in the external command data, limits the generation of the drive signal, said power window motor driving apparatus comprising:

an external command data reference inhibit means which, whenever any data error occurs in the external command data, inhibits the generation of the drive signal based only on the erroneous external command data received from the driver's seat while permitting generation of a drive signal based on the external command data for each window switch of each of the passenger seats.

2. A power window motor driving apparatus according to claim 1, further comprising:

a normal data holding means for holding the external command data during a normal state; and a normal data updating means for updating the data held in the normal data holding means to latest reception data every reception cycle of the external command data while the external command data is being received normally, wherein in the event that a data error occurs in the external command data, the drive signal is generated based on the external command data held in the normal data holding means and the internal command data.

3. A power window motor driving apparatus according to claim 2, further comprising:

an error time measuring means to measure a time that elapses from the occurrence of a data error in the external command data; and a normal external command data reference inhibit means which whenever the time measured by the error time measuring means exceeds a predetermined time, inhibits the generation of the drive signal based on the external command data held in the normal data holding means.

4. A power window motor driving apparatus according to claim 3, wherein the error time measuring means includes an error cycle count means to count the number of reception cycles during the data error in the external command data, and the normal external command data reference inhibit means inhibits the generation of the drive signal based on the external command data held in the normal data holding means when the number of cycles counted by the error cycle count means exceeds a predetermined number.

* * * * *